Aug. 11, 1942.　　　J. A. HOPWOOD　　　2,292,836
OUTLET FOR MILK DELIVERY CANS
Filed July 15, 1940　　　3 Sheets-Sheet 1
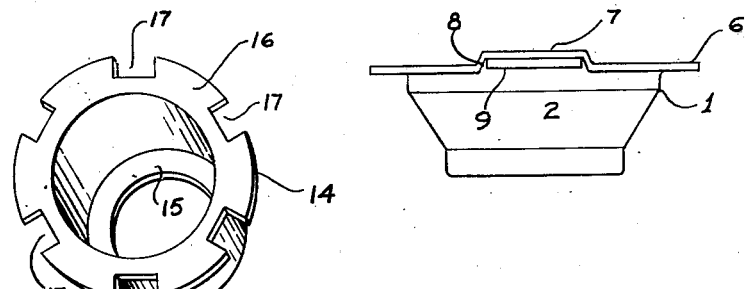
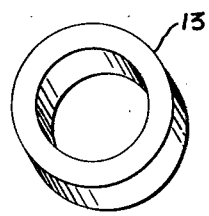
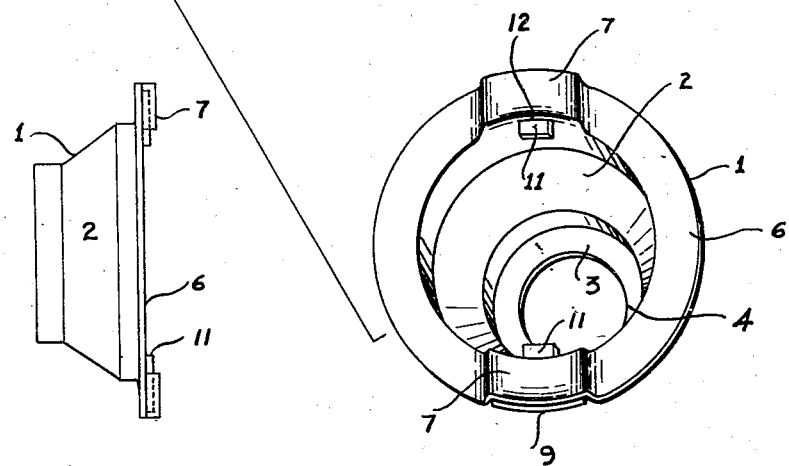
INVENTOR
JOHN A. HOPWOOD
BY Cornelius Zabriskie
ATTORNEY Aug. 11, 1942. J. A. HOPWOOD 2,292,836
OUTLET FOR MILK DELIVERY CANS
Filed July 15, 1940 3 Sheets-Sheet 2
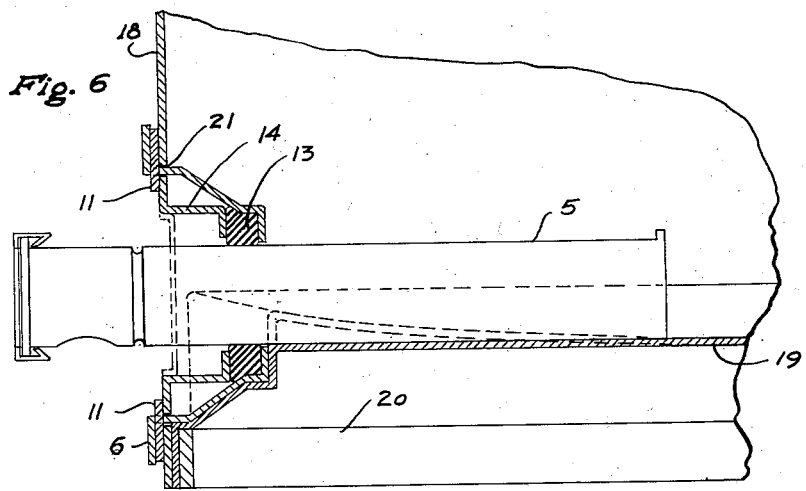
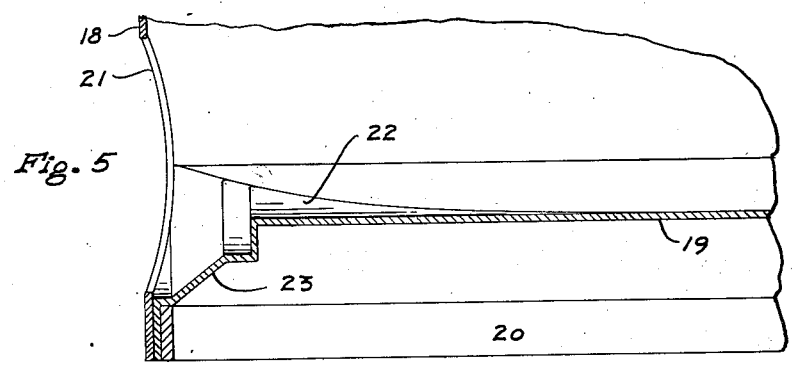
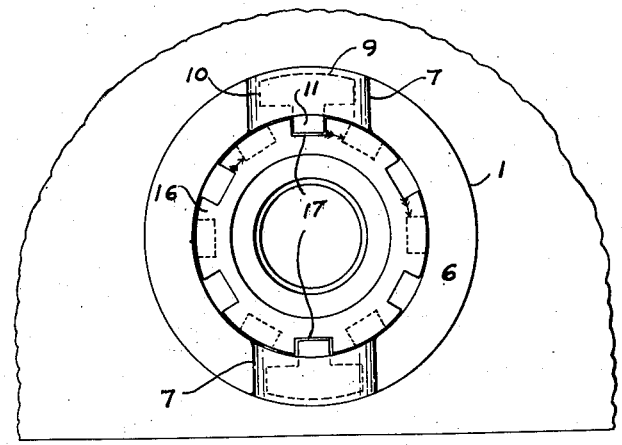
INVENTOR
JOHN A. HOPWOOD
BY Cornelius Zabriskie
ATTORNEY.

Aug. 11, 1942.   J. A. HOPWOOD   2,292,836
OUTLET FOR MILK DELIVERY CANS
Filed July 15, 1940    3 Sheets-Sheet 3

INVENTOR
JOHN A. HOPWOOD
BY
ATTORNEY

Patented Aug. 11, 1942

2,292,836

UNITED STATES PATENT OFFICE 2,292,836

OUTLET FOR MILK DELIVERY CANS

John A. Hopwood, Great Neck, N. Y., assignor to Monitor Process Corporation, Jersey City, N. J., a corporation of New Jersey Application July 15, 1940, Serial No. 345,634

7 Claims. (Cl. 285—166)

This invention is an outlet for milk delivery cans and is directed more particularly to improvements in such constructions as are illustrated in United States Letters Patent No. 2,186,083, issued January 9, 1940, to Monitor Process Corporation as assignee of William Tamminga.

That patent discloses a milk delivery can from which milk is adapted to be dispensed through a dispensing tube slidably mounted in one of the walls of the can. The joint between the tube and the wall of the can is important for it must preclude the leakage of milk and at the same time permit of free sliding movement of the tube.

In the construction of the patent, the side wall of the can is provided with an opening somewhat larger than the tube and interiorly of this opening is mounted a sheet metal cup having therein a central opening slightly larger than the diameter of the tube. The cup is secured to the wall of the can by rivets which pass through said wall and also through a reinforcing ring on the exterior of the can. The reinforcing ring has a central opening into which project two radial fingers and the opening of the wall of the can is similarly shaped, so that the fingers of the reinforcing ring register with and strengthen the corresponding fingers on the can wall. An elastic gasket is adapted to be received within the cup and is placed under axial pressure by means of a stamped pressure member having a peripheral flange with cut-outs which, when in register with the fingers of the reinforcing ring, permits the introduction of the pressure member into the cup, so that, when the cup is pressed tightly against the gasket and rotated, the pressure member will be locked in place.

This structure works very well in practice but it is expensive to make. The primary object of the present invention is to provide a much simpler and more economical arrangement which will be thoroughly satisfactory from a practical standpoint.

According to the present invention in its preferred practical form, the cup which is adapted to receive the gasket is formed to carry the locking fingers and is adapted to be seated in an opening in the wall of the can from the exterior of said wall, so that if the can wall is provided with a circular opening, the cup is simply seated in said opening and firmly secured in position by operations carried on externally of the can and without the necessity of an independent reinforcing ring or the formation of radial fingers in the can wall itself.

A further object of the invention is to provide a method whereby conventional milk delivery cans may be equipped with a milk delivery tube to adapt them to dispense milk through their walls.

Features of the invention, other than those adverted to, will be apparent from the hereinafter detailed description and claims, when read in conjunction with the accompanying drawings.

The drawings illustrate one practical embodiment of the invention, but the construction therein shown is to be considered as illustrative, only, and not as defining the limits of the invention.

Figure 1 is a perspective view showing in separated condition the pressure member, gasket and cup, which, when assembled, form a tight slidable joint about the delivery tube.

Figure 2 is an edge view of the cup looking in one direction.

Figure 3 is an edge view of the cup looking in another direction.

Figure 4 is a perspective view of one of the two pieces which constitute the radial locking fingers.

Figure 5 is a fragmental cross section of the lower portion of a milk delivery can formed to receive the parts illustrated in Figures 1-4, but with the parts omitted from this figure.

Figure 6 is a view similar to Figure 5, but with the parts including delivery tube assembled.

Figure 7 is a face view of the outside of the can with assembled parts as viewed from the left hand side of Figure 6.

Figure 8:
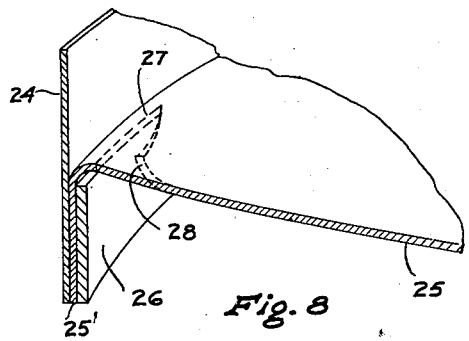
Figures 8–11 are fragmentary perspective sections showing consecutive method steps in modifying a conventional milk delivery can to permit of the installation of the cup of this invention therein.
Figure 9:
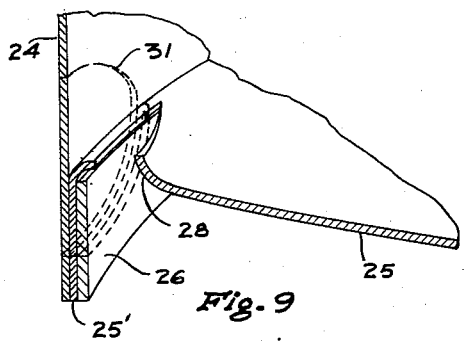

Referring to the drawings, 1 indicates generally a cup in which the milk delivery tube is adapted to be slidably mounted. This cup is provided with a side wall 2 provided at its inner end with an internal annular flange 3 providing within the inner periphery of the flange an opening 4 through which the milk delivery tube 5 (see Fig. 6) is adapted to pass. At the outer end of the side wall 2 is an exterior annular flange 6 which is upset at diametrically opposite points as indicated at 7 to provide at the back of the flange 6 seats 8 for finger pieces 9.

Each of the finger piece members is constructed as shown in Figure 4 as comprising a body 10 adapted to be received within the seat 8 and from which body projects a finger 11 adapted to extend through openings 12 in the wall 2 to project into the interior of the cup. In practice, the cup is stamped up from sheet metal and the finger pieces 9 are also stamped out from sheet metal, but are preferably of a considerably heavier gauge than that used in the cup, so that these pieces 9 will be strong and rugged and will adequately withstand the hard usage to which they will be subjected in practice. The pieces 9 are held in the positions shown by soldering or welding them in place, so that they constitute in the finished cup assembly a substantially unitary construction therewith.

A cup constructed as described is adapted to receive a gasket 13 shown in Figure 1 followed by a pressure member 14 also shown in this figure and of substantially the same construction as illustrated in the Tamminga patent hereinbefore referred to. This pressure member has a cylindrical portion adapted to project into the cup with an internal flange 15 bearing against the gasket 13 and an external flange 16 having cut outs 17. When two oppositely disposed cut outs are registered with the fingers 11, as shown in Figure 7, the pressure member may be introduced into the cup and when rotated, as indicated by the arrows in this figure, an undercut portion of the flange 16 will be brought into position back of the fingers 11 to lock the pressure member in place. The side wall 2 of the cup is shaped to permit the entry of the external flange 16 and at the same time to confine the gasket 13 as will be clear from Figure 6.

The cup, as shown in Figures 1, 2 and 3, is adapted for expeditious and economical assembly with a can especially manufactured for this purpose as shown best in Figures 5 and 6. Here the can is shown as having the usual cylindrical side wall 18 and a bottom 19 reinforced by a ring 20.

Figure 5 shows the can by itself. From this figure, it will be noted that the side wall of the can 18 is provided with a circular opening 21 which extends below the major portion of the bottom 19 and adjacent this circular opening 21 the bottom is especially formed to provide a channel or gutter 22 to receive the dispensing tube 5 and pressed as shown at 23 to permit of the introduction of the cup 1. The cup, as described, and separate from the gasket 13 and pressure member 14 is adapted to be inserted into the opening 21 from the exterior of the can. It is simply pressed into and through this opening until the flange 6 seats against the outer surface of the wall 18 and when thus positioned, it is soldered or welded in place. A sweating operation is thoroughly satisfactory for this purpose and the assembly can be accomplished in a simple, expeditious and economical manner. By attaching the cup as shown in Figures 6 and 7, it becomes in effect a permanent part of the can with the locking fingers 11 projecting across diametrically opposite sides of the opening 21.

When thus installed the dispensing tube 5, gasket 13 and pressure ring 14 may be readily applied to complete the assembly and to provide between the tube and the gasket a slidable leakproof joint. When desired the pressure member 14 can be readily removed followed by the gasket and the tube 5 by merely rotating the pressure member 14 until one of the upset cut outs 17 of its flange 16 is alined with the locking fingers 11 as this releases all of the parts for removal.

The arrangement shown in Figures 5 and 6 in particular is that of a can expressly made for use with a cup of the kind described. There are, however, in use many conventional cans which can be readily modified, so that they will be adapted to use a side outlet for milk by following the procedure shown in Figures 8-14. These figures show successive method steps whereby a conventional can may be manipulated to permit of installation of the cup.

In Figures 8-13 I have shown fragments of the side wall 24, the can bottom 25 and the reinforcing ring 26 which corresponds respectively to the parts 18, 19 and 20 of Figures 4 and 5.

It is to be understood, with respect to Figures 8-11, that the sections taken are in the medial plane of the zones of operation and that the can parts at both sides of the section are symmetrical and a duplication of what is shown in these figures.

The first step in the method consists in forming a slit 27 in the bottom of the can directly adjacent the inner surface of the ring 26 and opening up the inner margin of this slit as indicated at 28. This can be accomplished by forcing a sharp pointed cutter through the bottom of the can to produce the results shown in dotted lines in Figure 8 and in full lines in Figure 9.

The next step in the method consists in boring a hole 31 through the side wall 24 of a diameter big enough to receive the maximum exterior diameter of the side wall 2 of the cup 1. This cut can be conveniently made with a hollow cylindrical sharp edged cutter and should pass through not only the wall 24, but also the peripheral flange 25' of the bottom and also the reinforcing ring 26. In other words, this cut should extend through the side wall of the can to the slit 27, as indicated in dotted lines in Figure 9 and in full lines in Figure 10.

Figure 10:
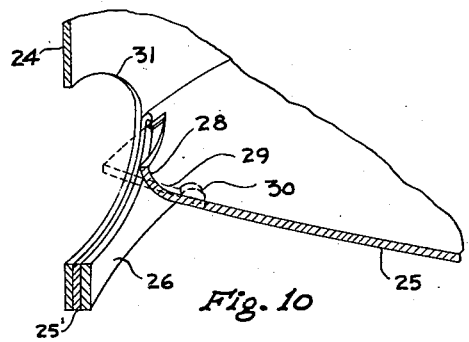
Figure 11:
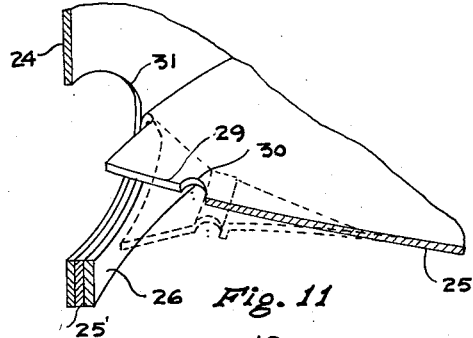

The next step in the operation consists in bending down the margin 28 shown in full lines in Figure 10 into the dotted line position of that figure. Immediately thereafter a slot 29 is formed from the edge of the slit 27 to the circular hole 30 spaced from the side wall. The hole 30 may be punched or bored and the slot 29 may be cut with a hack saw or other suitable implement, so that at the conclusion of this step, the parts will appear as shown in dotted lines in Figure 10 and in full lines in Figure 11.

The next step in the method consists in shaping that portion of the bottom 25 directly in line with the opening 31, so that the portion of the bottom directly adjacent the opening will substantially conform thereto. This may be conveniently accomplished by means of an appropriate die which will press down this portion of the bottom as shown in dotted lines in Figure 11 and form therein a gutter 32 shown best in Figures 12 and 14. This operation should be so carried out that the gutter formed will be shaped to accommodate the dispensing tube 5, while those portions of the bottom directly adjacent the opening will be shaped, as shown at 33, to substantially correspond to the shaping of the corresponding part of the bottom in Figures 5 and 6.

Figure 12:
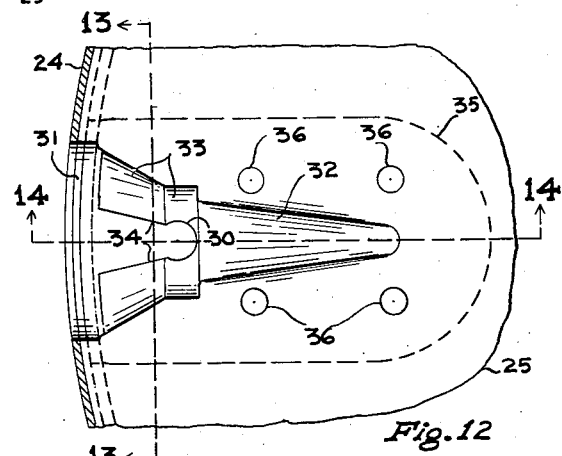
Figure 12 is a horizontal fragmentary section looking down on the bottom of the can and showing the method step next following that shown in Figure 11. The section of this figure is taken on the line 12—12 of Figure 13.
Figure 13:
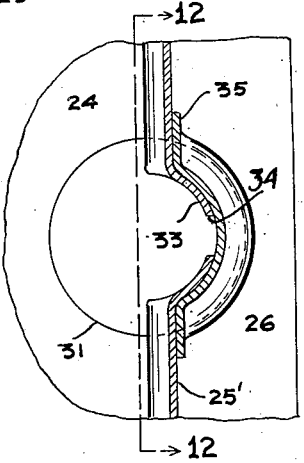
Figure 13 is a section on the line 13—13 of Figure 12.

When the bottom is acted upon in this way, the slit 29 which was formed opens somewhat as shown in Figures 12 and 13 and permits the forming of the bottom in the desired shape without rupturing the metal thereof.

Figure 14:
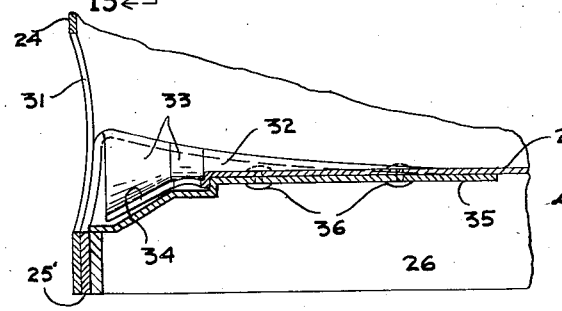
Figure 14 is a section on the line 14—14 of Figure 12.

After the bottom has been formed as stated, the next step consists in placing directly beneath the thus formed portion of the bottom a reinforcing plate 35 shaped to conform with and underlie that portion of the bottom which has been shaped as stated and a further portion of the bottom and ring 26 directly adjacent thereto, so that the plate underlies and reinforces that portion of the bottom adjacent the opening 31. The plate 35 and the abutting portion of the bottom are thoroughly tinned or otherwise prepared for attachment to one another and they are thereupon sweated in place. The attachment can be augmented by rivets 36 if desired or, alternatively, the plate 35 may be welded in place. The finished construction appears as shown in Figure 14, although the edges may be overlaid with solder or otherwise as may be desired. From a comparison between Figure 14 and Figure 5, it will be noted that through the operations described, a conventional can can be readily modified to receive the side delivery cup and associated gasket, pressure member and the delivery tube.

I have described the operations illustrated in Figures 8-14 in connection with the use of simple implements to carry out these steps so that they may be clearly understood. Special machinery and apparatus are, however, employed in commercially practising this method, so as to expedite the operations and produce uniform results.

In the foregoing detailed description, I have set forth the invention in one of its preferred practical forms and one method for carrying out the same, but the invention is to be understood as fully commensurate with the appended claims.

Having thus fully described the invention, what I claim as new and desire to secure by Letters Patent is:

1. A milk delivery can provided in the wall thereof with an opening, a cup extending through said opening from the exterior thereof, said cup being provided with an external flange bearing against the outer face of said wall and permanently secured thereto and said cup having an interal flange with a central opening through which a dispensing tube is adapted to project into the can, a gasket seated against the internal flange, locking fingers carried by the cup and extending in an inwardly radial direction from the external flange thereof, and a pressure member having cut outs permitting the pressure member to be introduced into the cup from the exterior of the can when said cut outs are juxtaposed with said fingers, said pressure member being thereupon rotatable to lock the pressure member against withdrawal, said pressure member being formed to engage with and hold the gasket to a seat against the interior flange of the cup and in liquid tight engagement with said dispensing tube.

2. A milk delivery can comprising a wall having therein an opening, a recessed cup extending through said opening and provided at its outer end with an external flange bearing against the outer face of said wall and permanently secured thereto, said flange having attached thereto locking members extending in an inward radial direction from said flange, said cup being provided at its inner end with an internal flange surrounding the central opening through which a delivery tube is adapted to project, a gasket seated in the cup against said internal flange, and a pressure member detachably interposed between the gasket and the locking members to press the gasket against the inner flange of the cup and into liquid tight engagement with said dispensing tube.

3. A slide outlet mounting for milk delivery cans comprising a cup shaped body provided with an open top having an external flange upset to provide within the bottom of the flange recesses, the side wall of the cup having openings communicating with said recesses, locking members seated within said recesses and projecting through said openings into the interior of the cup, the bottom of the cup having a central opening surrounded by an annular flange projecting interiorly from the bottom wall of the cup.

4. A slide outlet mounting for milk delivery cans comprising a cup shaped member having tapering side walls, the smaller end of the cup being provided with an internal flange surrounding a central opening and the larger end of the cup having an external flange, and locking members carried by the flange and projecting into the opening at the larger end of the cup.

5. A slide outlet mounting for milk delivery cans comprising a cup shaped member having tapering side walls, the smaller end of the cup being provided with an internal flange surrounding a central opening and the larger end of the cup having an external flange, upset to provide on its back side a plurality of recesses and locking plates positioned in said recesses and projecting through apertures in the side wall of the cup for a distance beyond said side wall.

6. A pressure member of the character described comprising an annular wall, one end of which is provided with an internal flange and the other end of which is provided with an external flange having circumferentially spaced notches in its periphery.

7. A milk delivery can comprising a wall having an opening therein, a recessed cup extending through said opening and provided at its outer end with an external flange bearing against the outer face of the wall and permanently secured thereto, said flange being provided with recesses and the said wall of the cup adjacent the recesses having openings communicating with the recesses, locking members seated within said recesses and projecting through said openings into the interior of the cup, said cup being provided at its inner end with an internal flange apertured for the passage of a delivery tube therethrough, a gasket seated in the cup against said internal flange, and a pressure member, one end of which is provided with an internal flange bearing against the gasket and the other end of which cup is provided with an external flange having circumferentially spaced notches in its periphery to cooperate with the locking members of the cup.

JOHN A. HOPWOOD.